Aug. 19, 1930. H. C. BIETTE 1,773,341
STOVE CABINET
Filed Jan. 24, 1927
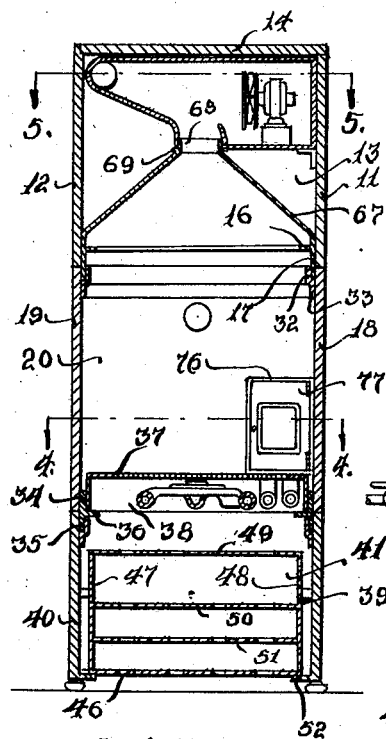
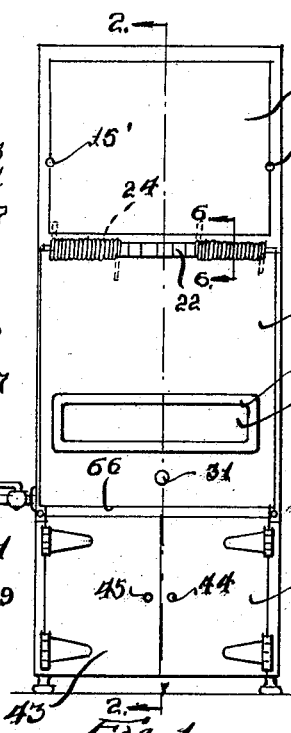
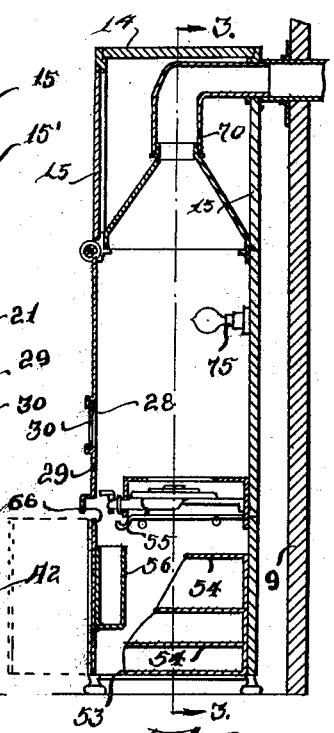
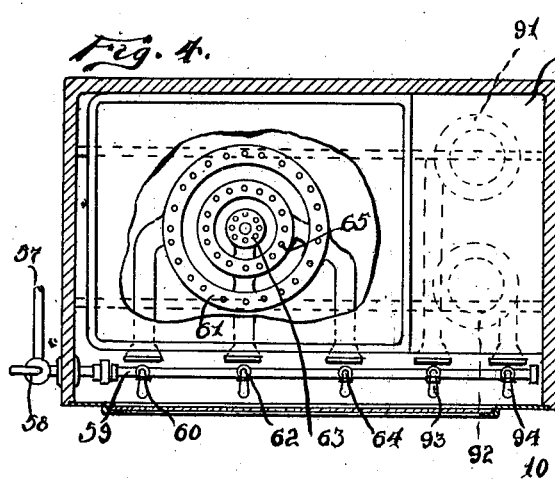
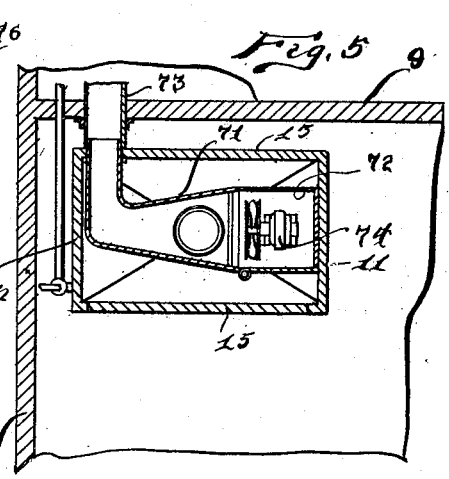
INVENTOR.
Henry C. Biette
BY
ATTORNEY.

Patented Aug. 19, 1930

1,773,341

UNITED STATES PATENT OFFICE

HENRY C. BIETTE, OF DETROIT, MICHIGAN, ASSIGNOR OF ELEVEN PER CENT TO JOHN S. LONGTIN, OF WYANDOTTE, MICHIGAN, FIFTEEN PER CENT TO ERNEST C. SCHAFFER, AND FIFTEEN PER CENT TO PATRICK S. CARPENTER, BOTH OF DETROIT, MICHIGAN

STOVE CABINET

Application filed January 24, 1927. Serial No. 163,168.

My invention relates to a new and useful improvement in a stove cabinet adapted particularly for mounting in a kitchen so as to provide a cabinet in which the stove used for cooking purposes may be enclosed and concealed from view.

It is an object of the present invention to provide a cabinet of this class so constructed and arranged as to assure a proper ventilation so that the withdrawal of all vapors and odors from the food being cooked on the stove may be effectively carried on.

Another object of the invention is the provision in a stove cabinet of this class of a heat collecting and expelling chamber wherein the heat and various odors may accumulate and be expelled through the flue provided.

Another object of the invention is the provision of a cabinet of this class arranged in sections so that the cabinet may be very easily and quickly installed and removed, when desired.

Another object of the invention is the provision of a fan in the heat collecting and expelling chamber to effect a forced draft so that the odors, smoke, etc., may be positively led off from the stove and driven outwardly through the flue.

Another object of the invention is the provision in a cabinet of this class of a lower compartment in which may be provided a plurality of shelves upon which pans and the like may be deposited.

Other objects will appear hereinafter.

The invention consists in the combination and arrangement of parts hereinafter described and claimed.

The invention will be best understood by a reference to the accompanying drawings which form a part of this specification and in which, Fig. 1 is a front elevational view of the invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 3 with parts broken away.

Fig. 5 is a fragmentary sectional view taken on line 5—5 of Fig. 3.

Fig. 6 is a fragmentary view taken on line 6—6 of Fig. 1.

As shown in the drawings the invention comprises a cabinet made from a plurality of sections, and in the form shown, I have provided three of these sections, although it is believed apparent that the number may be increased if desired for affording greater capacity to the cabinet.

The uppermost section comprises the side walls 11 and 12, the rear wall 13, and the top wall 14, the forward side of said section being enclosed by a panel 15 which is retained by fastening means 15', so that the forward wall or panel 15 may be removed, when desired.

Mounted on the inner surface of the walls of the upper section is an angle iron having the horizontally extending portion 16 which serves as a bracket, and the vertically extending portion 17 which serves as a fastening means to be described hereafter.

The middle section comprises the side walls 18 and 19, and the rear wall 20.

Forming a closure for the forward side of this section is a door 21 which is hingedly mounted at one edge on the rod 22, the springs 23 and 24 normally tending to move the door 21 to open position, as shown in dotted lines in Fig. 2. As shown in Fig. 6 one end 25 of the springs 23 and 24 is embedded in the panel 15, and the other end 27 thereof is in engagement with the door 21, these springs being coiled upon the rod 22. Formed in the door 21 is an opening 28 around which extends a retaining frame 29 for retaining the transparent closure 30 in position over the opening 28 so that when the door 21 is in closed position, the condition of articles within the middle section may be inspected through the transparent closure 30. A suitable catch 31 serves normally to fasten the door 21 in position.

Mounted on the inner surface of the central section, adjacent its upper end is a strip of material 33 having an outwardly offset end 32 to provide a channel in which the portion 17 of the angle iron may engage, this portion 17 projecting beyond the lower edge of the uppermost section, as clearly appears from Fig. 3. In this way, the angle iron 17 and the retaining strip 33 serve to combine the sections together or prevent their lateral relative displacement.

Mounted on the inner surface of the central section at its lower edge is a T iron having the arm 34 projecting upwardly of the section, and the arm 35 projecting downwardly therefrom beyond the lower edge, the trunk 36 of the T projecting inwardly to afford a bracket. The arm 34 is suitably secured to the central section walls in any desirable manner.

Resting upon the bracket forming portion 36 is a plate 37 which serves as a cover for a gas stove used with the device, the downwardly projecting flange 38 on this plate 37 engaging the bracket forming portion 36.

The lowermost section comprises side walls 39 and 40 and a rear wall 41, and the forward side thereof is closed by the swinging doors 42 and 43, each of which is provided with a suitable knob 44 and 45. Projecting inwardly from the walls of the lowermost section, adjacent the lower end thereof, is a flange 52 upon which rests the bottom 46 of a frame forming member having an upwardly extending side 47 and 48. Engaging the upper edges of the sides 47 and 48 is a shelf forming plate 49 and shelf forming plates 50 and 51 engage in slits formed in these members 47 and 48, so that in the lowermost section there is provided a compartment in which pans and the like may be deposited, the shelves being removable so that they may be easily and quickly cleaned, when desired.

An opening 53 is formed in the member 46 to permit entry of air into the lowermost section, this air being permitted to escape through the openings 54, and into the central section and the lowermost sections. A container 56 is mounted within the lowermost section to also serve as a supporting member for various kitchen utensils. A drip trough 55 is mounted in the central section, adjacent its lower edge. A gas pipe 57 is illustrated in which is positioned the gas cock 58, to control the flow of gas to the feed pipe 59. The gas passing through the feed pipe 59 may, when the gas cock 60 is operated, pass into the largest circular burner 61 which is positioned beneath the plate 37. The gas cock 62 controls the flow of gas to the small central burner 63, and the gas cock 64 controls the flow of gas to the circular burner 65. It will be noted that these burners are concentrically arranged so that the burner is one which is compact, while at the same time, various degrees of heat may be applied to the plate 37. A slit 66 is formed above the doors 42 and 43 to permit the entry of air beneath the burners, this space being provided by offsetting the lower edge of the door 21, as clearly shown in Fig. 2.

Resting upon the bracket forming flange 16 is a canopy 67 having the cylindrical neck 68, projecting outwardly from the periphery of which is a flange 69, upon which rests the collar 70 which projects downwardly from the chamber forming member 71, this chamber forming member providing a compartment 72 in which the heat, vapors, dust, etc. may be collected and from which they may be expelled outwardly through the flue 73 which is provided in most buildings for a gas vent.

I have shown an electric fan 74 mounted in the compartment 72 to effect a forced draft.

Mounted on the rear wall 20 of the central section is a light bulb 75.

Mounted on the plate 37 is a gas oven 76 having a door 77 hingedly mounted thereon, suitable burners 91 and 92 being positioned beneath the oven 76, so that the operation of the gas cocks 93 and 94 will control the flow of gas to these burners.

In this way I have provided a sectional stove cabinet which may be very easily and quickly assembled, which may be economically manufactured, and which provides a maximum efficiency on account of the presence of the heat collecting and expelling chamber, into which all of the vapors and odors will arise and collect.

By having the panel 15 arranged as described, access to the interior of the uppermost section is provided for cleaning the canopy 67 or making necessary adjustments.

The cabinet so constructed is one which comprises a minimum amount of space and yet affords a maximum amount of space for use on account of the arrangement described.

The space in the lowermost section may be used for storing kitchen utensils, as already described, in which case the air circulating therethrough serves to prevent undesirable odors and to assist in sterilizing the utensils contained therein. If desired, the lowermost section may be used for containing an iceless refrigerator as the space is convenient for this purpose. Furthermore, the use of the flat plate 37 is one which lends itself particularly to a cabinet of this class and affords a most desirable arrangement with the stove, as the flat surface is quite desirable in a cabinet of this class permitting a maximum number of utensils to be placed upon the stove and affording a sufficiently uniform distribution of heat over the plate 37.

As clearly appears in Fig. 4, I have provided a pair of arms 97 and 98 which serve to extend across the lowermost section and afford a means of support for an ordinary gas stove, should the legs be removed therefrom and the gas stove placed within the cabinet.

It is evident that by enclosing the stove in a cabinet of this nature, the fire hazard is considerably reduced.

While I have illustrated and described the preferred form of my invention, I do not wish to limit myself to the precise form of structure shown, but desire to avail myself of such variations and modifications as may come within the scope of the appended claims.

Having thus described my invention what I claim as new and desire to secure by Letters Patent is:

1. A stove cabinet of the class described comprising: a plurality of superimposed sections; a stove mounted in one of said sections; means for supporting said stove; a hood mounted in the uppermost of said sections for directing the flow of vapors and gases from said cabinet; a heat collecting chamber communicating with said hood; and means in said chamber for expelling vapors and gases therefrom by forced draft.

2. A stove cabinet of the class described, comprising: a plurality of superimposed sections; a hood mounted in the uppermost of said sections and provided with an opening in its top; a chamber forming member also mounted in the uppermost of said sections and communicating with the interior of said sections only through the opening in said hood, said chamber forming member having an outlet opening formed therein.

3. A device of the class described comprising a stove cabinet; a heat collecting chamber in the upper portion of said cabinet; a conduit communicating therewith and extending exteriorly of said cabinet; and means positioned interiorly of said cabinet for producing a forced draft in said chamber directed toward said conduit.

4. A device of the class described comprising a stove cabinet; a hood mounted in said cabinet adjacent its upper end, said hood having an opening at its upper side; a heat collecting chamber in said cabinet communicating through said opening with said hood, said hood partitioning the upper portion of said cabinet from the lower portion.

5. A device of the class described comprising a stove cabinet; a hood mounted in said cabinet adjacent its upper end, said hood having an opening at its upper side; a heat collecting chamber in said cabinet communicating through said opening with said hood, said hood partitioning the upper portion of said cabinet from the lower portion; a conduit communicating with said chamber; and means in said chamber for effecting a forced draft toward said conduit.

6. In a device of the class described: a stove cabinet; a stove mounted in said cabinet; means for supporting said stove; a hood mounted in the upper part of said cabinet above said stove for directing flow of vapors and gases from said cabinet; a heat collecting chamber communicating with said hood; and means in said chamber for expelling vapors and gases therefrom by forced draft.

In testimony whereof I have signed the foregoing specification.

HENRY C. BIETTE.